US006412642B2

(12) United States Patent
Charles et al.

(10) Patent No.: US 6,412,642 B2
(45) Date of Patent: Jul. 2, 2002

(54) METHOD OF APPLYING MARKING TO METAL SHEET FOR SCRAP SORTING PURPOSES

(75) Inventors: David F. Charles, Farmington Hills, MI (US); Greg J. Courval, Napanee (CA); Michael P. Thomas, Farmington Hills, MI (US); Michael J. Wheeler; Ian Wilson, both of Kingston (CA)

(73) Assignee: Alcan International Limited, Montreal (CA)

( * ) Notice: Subject to any disclaimer, the term of this patent is extended or adjusted under 35 U.S.C. 154(b) by 0 days.

(21) Appl. No.: 09/818,482

(22) Filed: Mar. 27, 2001

Related U.S. Application Data

(63) Continuation-in-part of application No. 09/440,485, filed on Nov. 15, 1999.

(51) Int. Cl.[7] ............................................... B07C 5/342
(52) U.S. Cl. ................. 209/3.3; 209/3; 209/4; 209/9; 209/577; 209/587; 209/580
(58) Field of Search ........................... 209/3, 3.3, 930, 209/4, 7, 9, 577, 580, 587

(56) References Cited

U.S. PATENT DOCUMENTS

| 5,201,921 A | 4/1993 | Luttermann et al. ........... 8/506 |
| 6,100,487 A | 8/2000 | Schultz et al. ............... 209/580 |

FOREIGN PATENT DOCUMENTS

| EP | 0861910 | 9/1998 |

OTHER PUBLICATIONS

R.K. Wyss et al., "Color Sorting Aluminum . . . ," Light Metals 1999, ed. C.E. Eckert, pr. 1093–98 (Minerals, Metals & Materials Soc'y 1999).

R.D. Brown, Jr., et al., "Sorting Techniques for Mixed Metal Scrap," Conservation & Recycling 9:73–86 (1986).

PCT/CA00/01349, International Search Report, Apr. 10, 2001.

Januszkiewicz et al., "UV–Fluorescence Spectroscopic Method for Monitoring Tramp Oil Contamination in Hot Roling Emulsions," Lubrication Engineering, 47, Jun. 1991, 448–452.

Januskiewicz et al., UV–Fluorescence Spectroscopic Method for Monitoring Tramp Oil pp. 1–9 + 9 Figs., Paper presented at 45th Annual Mtg. STLE, May 7–10, 1990.

*Primary Examiner*—Donald P. Walsh
*Assistant Examiner*—Jonathan R. M. Miller
(74) *Attorney, Agent, or Firm*—Cooper & Dunham LLP

(57) ABSTRACT

Application of surface marking to metal stock, such as aluminum sheet, prior to or during scrap-generating manufacturing operations, to provide a detectable mark on pieces of manufacturing scrap derived from the marked sheet and commingled with scrap of other aluminum alloy sheet, so that the scrap can be sorted and the marked alloy scrap pieces separated from scrap of other alloy sheet to which the marking was not applied. Different markings, providing detectably different marks, may be respectively applied to sheet of different compositions if scrap pieces of more than two different compositions or compositional families are to be sorted and separated from each other.

36 Claims, 3 Drawing Sheets

METHOD OF APPLYING MARKING TO METAL SHEET FOR SCRAP SORTING PURPOSES

CROSS REFERENCE TO RELATED APPLICATION

This application is a continuation-in-part of applicants' copending U.S. patent application Ser. No. 09/440,485, filed Nov. 15, 1999, the entire disclosure of which is incorporated herein by this reference.

BACKGROUND OF THE INVENTION

This invention relates to the sorting of metal scrap constituted of a mixture of scrap metal pieces of two or more different alloy compositions, so as to separate the metal pieces of one composition from the other or others. More particularly, it is directed to methods of marking aluminum sheet for scrap sorting purposes.

As used herein, the term "aluminum" refers to aluminum metal and aluminum-based alloys, viz., alloys containing more than 50% by weight aluminum. "Scrap" refers to pieces of metal in solid as distinguished from molten state.

An important and illustrative field of use for such methods (to which, however, the invention in its broader aspects is not limited) is the sorting of manufacturing scrap generated incident to automobile manufacturing operations utilizing aluminum sheet. The production of automobile body components or other automotive parts by forming aluminum sheet generates substantial quantities of metal scrap, i.e., pieces of metal from the sheet stock subjected to the forming and related operations such as trimming. The term "manufacturing scrap" is used herein to differentiate such scrap from post-consumer scrap (generated from used and discarded manufactured articles). Manufacturing scrap differs from post-consumer scrap in that, being generated incident to forming operations, manufacturing scrap does not bear a paint or other permanent opaque coating on its major surfaces, whereas post-consumer scrap often has major surfaces more or less covered with paint or other substances applied after forming.

As is well known, for both environmental and economic reasons it is desirable to recycle sheet metal scrap, including that generated in the manufacture of automotive components from sheet aluminum. In the simplest sense, recycling of the scrap involves remelting the scrap to provide a body of molten metal that can be cast and rolled into useful aluminum sheet.

Frequently, however, automotive manufacturing scrap includes a mixture of scrap pieces of two or more aluminum alloys differing substantially from each other in composition. A specific example of mixed manufacturing scrap of aluminum sheet, generated in certain present-day automotive manufacturing operations, is a mixture of pieces of one or more alloys of the Aluminum Association 5000 series (with four-digit registration numbers between 5000 and 5999) and pieces of one or more alloys of the Aluminum Association 6000 series (with four-digit registration numbers between 6000 and 6999).

The presence of commingled pieces of different alloys in a body of scrap limits the ability of the scrap to be usefully recycled, unless the different alloys (or, at least, alloys belonging to different compositional families such as those respectively designated by the Aluminum Association series 1000, 2000, 3000, etc.) can be separated prior to remelting. This is because, when commingled scrap of plural different alloy compositions or composition families is remelted, the resultant molten mixture contains proportions of principal alloying elements (of the different compositions) that are too high to satisfy the compositional limitations of any particular commercial alloy. While it would therefore be beneficial to be able to sort a mass or body of aluminum sheet scrap containing a mixture of pieces of different alloys, to separate the different alloy compositions or at least different alloy families before remelting for recycling, scrap pieces of different aluminum alloy compositions are not ordinarily visually distinguishable from each other.

Published European Patent Application EP 0 861 910 A2 describes procedures for treating commingled aluminum scrap of two or more wrought aluminum alloys to impart different colors to surfaces of scrap pieces of different compositions for the purpose of sorting by alloy type or family (such as Aluminum Association series). The described procedures involve a separate step for introducing color onto the alloy before sorting, but after the alloy pieces of different compositions have become commingled, via a batch or semi-continuous chemical etch or series of etches. The chemical agents react with alloys of different compositions to produce discernable surface color differences between them. Methods for introducing color proposed include treatment with caustic, acid, oxidizing agents, dyes and combinations thereof.

That is to say, in the process of the European patent application, the marker is applied to every piece of scrap by a chemical treatment process and is subsequently detected by color differentiation. Treating every piece of scrap is inherently an expensive process, involving the performance of special, extra steps after the scrap is collected and before it can be sorted; and since the sortability of the commingled scrap is dependent on the ability of the treatment to react with different alloys to produce discernably different, composition-determined colors, there are limits to the coloring agents that can be used and/or to the types of alloys that can be differentiated.

SUMMARY OF THE INVENTION

An object of the present invention is to provide improvements in the sorting of metal scrap containing scrap pieces of different compositions, affording enhanced convenience and economy. Another particular object is to provide such improvements while avoiding a separate or special step of marking the scrap (i.e., after the scrap has been generated) to differentiate pieces of different compositions for such sorting. A specific object is to provide improved methods, affording the advantages just stated, of marking aluminum sheet to facilitate subsequent sorting of scrap including scrap pieces derived from the sheet together with scrap pieces of sheet of other aluminum alloys or alloy families.

To these and other ends, the invention embraces the application of surface marking to metal stock (i.e., metal produced or prepared in a form for working, cutting, etc., to manufacture articles or components), particularly aluminum sheet, prior to or during the performance of scrap-generating operations such as manufacturing operations.

In certain embodiments of the invention, the marking is performed by application of a marking agent to the stock or sheet during and as a part of procedures for preparing the sheet or other stock for subsequent scrap-generating manufacturing operations. For example, in preparing aluminum sheet for forming into automotive components or the like, it is conventional for the maker and supplier of the sheet to apply lubricant or prelubricant to surfaces of the sheet; in accordance with the present invention, the marking agent may be incorporated in the lubricant or prelubricant prior to application thereof to the sheet surfaces.

It is found that this method, utilizing a conventional sheet-preparing step for applying the marking agent and thereby avoiding any separate or added treatment of either sheet or scrap, can provide a detectable mark on surfaces of manufacturing scrap derived from the marked sheet, the marking agent being initially applied to the sheet in an amount effective to establish a deposit of mark-providing substance that will survive the scrap-generating manufacturing operations to which the sheet is subjected.

The term "mark" as used herein is not limited to a deposit of marking agent which is visible or discernable as a mark on the original sheet; i.e., the marking agent provides a detectable mark on the scrap, not necessarily a visible mark on the sheet. Moreover, while in many instances detection of the mark may be performed by optical scanning, the detectable mark on scrap surfaces contemplated by the invention in its broadest aspects is not limited to a mark that is optically detectable, but also broadly includes a mark that is or can be detected in non-optical ways, e.g. by a sniffing device as used to detect drugs at airports, or by a laser that evaporates surface material in a puff or plume with a short pulse, with immediate analysis of the plume to identify the "mark" substance.

The sheet to which the marking agent is applied may be of a single specific alloy composition, or may include sheet of two or more specific compositions within a compositional family (such as an Aluminum Association series, e.g., 1000, 2000, 3000, etc.) of which the members are sufficiently close in composition so that remelting of their commingled scrap provides a readily usable metal product. In the case where the manufacturing operations are such as to employ aluminum sheet of two composition families, generating scrap derived from sheet of both families, the marking agent is applied only to the sheet of one family, and not to the sheet of the other family, prior to the manufacturing operations. The residual optically detectable mark that thereby results, being present only on the surfaces of scrap pieces derived from sheet of the aforesaid one compositional family, enables easy sorting and separation of the pieces of the scrap into their respective compositional families, for remelting and recycling. Alternatively, different marking agents (respectively providing detectably different marks on scrap surfaces) may be applied to sheet of different alloy compositions or composition families, facilitating the sorting of scrap including scrap pieces of more than two compositions or families which are to be separated from each other.

Stated in some respects more broadly, the present invention concerns improvements in sorting metal scrap comprising a mixture of scrap metal pieces respectively derived from metal stock of at least two different compositions (e.g., at least two different compositional families), to separate the scrap metal pieces of a first of the compositions from the scrap metal pieces of a second of the compositions, the stock of each of the two compositions having a surface and being initially separate from the stock of the other of the two compositions, the scrap being generated and mixed during or after procedures performed on the stock of the two compositions, and the scrap metal pieces of each of the two compositions bearing visible portions of the surface of the stock from which they are derived. In this broad sense, the method of the invention embraces the steps of selectively applying a marking agent to the surface of only the stock of the first composition, prior to the performance of the aforesaid procedures, while the first-composition metal stock is separate from the metal stock of the second composition, the marking agent being applied in an amount effective to provide a detectable surface mark on surface portions on the scrap metal pieces of the first composition after the performance of the aforesaid procedures, such that the mark is present only on the scrap metal pieces of the first composition in the mixture, and scanning the mixture of metal scrap to detect the mark on scrap metal pieces therein, and thereby to distinguish the scrap metal pieces of the first composition from other scrap metal pieces in the mixture. Such a method typically further includes a step of segregating the scrap metal pieces on surface portions of which the mark is detected upon detection of said mark thereon in the scanning step.

The term "scanning" herein embraces ordinary visual scrutiny of the scrap with the human eye, in instances where the mark is discernable at visible wavelengths of light, with manual separation of scrap pieces, as well as scanning with apparatus e.g. of types currently commercially available and which may be capable of viewing the surfaces of the scrap pieces at ultraviolet, visible, or infrared wavelengths and mechanically sorting the scrap pieces in accordance with the presence or absence of a detected mark thereon. In addition, the term "scanning" is not limited to optical scanning but also includes non-optical scanning of the strip, e.g. by a sniffing device or a device that evaporates surface material and analyzes the resulting vapor plume to identify the mark substance, as mentioned above. In convenient embodiments, to which however the invention is not limited, the mark is a color, detectably present on visible surface portions on the first-composition scrap metal pieces, that is detectably different from the color of the unmarked second-composition scrap metal pieces.

The invention in this broad sense is applicable to the sorting of scrap of any metal, including (by way of example), steel, copper and magnesium alloys.

In an important particular aspect, the invention contemplates the provision of a method of applying a marking agent to aluminum sheet for scrap sorting purposes, comprising preparing aluminum alloy sheet of a first alloy composition for subjection to a manufacturing operation, the sheet having a surface, while applying to the sheet surface, incident to preparing the sheet as aforesaid, a marking agent in an amount effective to provide a detectable surface mark on scrap metal pieces derived from the sheet during or after the manufacturing operation and bearing visible portions of the sheet surface, thereby to enable scrap pieces of the sheet to be distinguished from scrap pieces of sheet of an aluminum alloy of other composition different from the first composition in a mixture of scrap metal pieces of the first and other compositions. Conveniently, the preparing step may be a surface treatment (e.g., a coating, washing, etching, prelubricating or lubricating step) which comprises applying a substance to the surface of the first-composition sheet, the method further including the step of incorporating the marking agent in the substance prior to application of the substance to the first-composition sheet surface. In specific embodiments, the applying step comprises incorporating the marking agent in a lubricant or prelubricant and applying the lubricant or prelubricant containing the marking agent to the sheet.

Where sheet of alloys of two different compositions (e.g. sheet of two different families of compositions) is being produced and prepared for manufacturing operations which will generate scrap comprising scrap metal pieces of both compositions, the method in particular embodiments includes preparing aluminum sheet of the first alloy composition for subjection to a manufacturing operation, and preparing aluminum sheet of a second alloy composition different from the first composition for subjection to a manufacturing operation, the second-composition sheet also having a surface, while selectively applying only to the surface of the first-composition sheet, and not to the surface of the second-composition sheet, incident to preparing the sheets as aforesaid, a marking agent in an amount effective to provide a detectable mark on scrap metal pieces derived from the first-composition sheet during or after the manufacturing operation and bearing portions of the first-composition sheet surface, thereby to enable scrap pieces of the first-composition sheet to be distinguished by scanning from scrap pieces of the second-composition sheet in a mixture of scrap metal pieces of the first and second compositions. Thus, where the applying step comprises incorporating the marking agent in a lubricant or prelubricant applied to the first-composition sheet, any lubricant or prelubricant applied in the step of preparing the second-composition sheet is essentially free of the marking agent.

In some instances, a different marking agent (providing a mark detectably different from that of the first-mentioned marking agent) may be applied to the second-composition sheet, for example by incorporating the second marking agent in a lubricant or prelubricant applied to the second-composition sheet surface prior to the manufacturing operations. This can be useful if the scrap contains more than two different compositions each of which is to be segregated from the others. In the case where the scrap is to be sorted into only two compositions (or composition families), however, it is convenient and economically beneficial to use only one marking agent, applied to sheet of only one of the compositions or composition families and providing a mark that, on the scrap pieces, enables the marked scrap pieces to be distinguished optically from unmarked scrap pieces. Thereby, the use of a second marking agent and the step of incorporating such a second agent in the lubricant for second-composition sheet are avoided.

In particular embodiments of current commercial interest, e.g. in the manufacture of automotive components, the first-composition sheet consists of sheets of one or more alloy compositions within a first family of alloys consisting of specifically different compositions having at least one shared compositional characteristic, and the second-composition sheet consists of sheets of one or more alloy compositions within a second family of alloys consisting of specifically different compositions having at least one shared compositional characteristic that differentiates the members of the second family from the first family. Illustratively, these families may respectively be the Aluminum Association 5000 and 6000 alloy series.

In another aspect, the invention embraces a method of sorting metal scrap generated incident to manufacturing operations performed on aluminum sheet of at least two different alloy compositions, the sheet of each composition having a surface and the scrap comprising a mixture of scrap metal pieces respectively derived from the aluminum sheet of each of the compositions and bearing visible portions of the surface of the sheet from which the pieces are derived, the method comprising subjecting, to the manufacturing operations, sheet of a first of the compositions bearing on its surface a marking agent applied thereto, prior to the manufacturing operations, in an amount effective to provide a detectable mark on the scrap metal pieces derived from the first-composition sheet, and sheet of a second of the compositions which is essentially free of the marking agent; and scanning the mixture of metal scrap to detect the mark on scrap metal pieces therein, thereby to distinguish the first-composition scrap metal pieces from other scrap metal pieces.

Embodiments of the invention such as those involving the addition of a fluorescent tracer-type marking agent to a lubricant or prelubricant conventionally supplied to the sheet by the sheet producer prior to delivery to a manufacturing customer, sometimes present a drawback in that the tracer-containing lubricant may be removed and/or transferred to scrap pieces of different composition (not initially bearing the tracer) incident to manufacturing procedures or subsequent handling and commingling of the scrap. When the marking agent is thus removed or transferred, the ability to distinguish between scrap of different compositions in the scanning step can be impaired or lost.

Accordingly, as a still further feature of the invention, in important preferred embodiments thereof, the step of selectively marking the stock surface of metal stock of only the first composition comprises applying a detectable marking to only those surface portions of the first-composition stock which will become surface portions of the scrap generated in the manufacturing procedure performed on the stock. Stated with reference to stamping operations for producing an article from stock and detaching scrap portions of the stock from the article, in these embodiments the marking is applied only to surface portions of the first-composition stock that will be detached as scrap and not to areas that will be included in the produced article.

This selective application of the marking only to areas of the stock that will be scrapped enables application of an indelible marking without compromising desired surface qualities or characteristics of the produced article. By "indelible" is meant, in this sense, any mark that is not substantially removable from the stock or scrap surface, or transferrable to other surfaces (such as surfaces of scrap of different composition), in the manufacturing and subsequent scrap handling and commingling procedures to which the marked stock and scrap are subjected. A variety of paints and inks are suitably "indelible" for application in such embodiments of the invention. More broadly, the indelible marking need not be an applied marking agent but can take the form of a detectable surface deformity such as an embossment applied, e.g. concurrently with a blanking operation or in some instances a stamping operation for producing an article, to areas of stock that are to be scrapped.

Thus, in such preferred embodiments the method of the invention contemplates selectively marking only surface portions, of stock of one composition, that will not be included in an article produced (by a stamping or other operation) from the stock, to establish on those selectively marked surface portions an indelible and detectable mark enabling scrap of the stock to be distinguished from unmarked scrap of other composition by a scanning step.

Further features and advantages of the invention will be apparent from the detailed description hereinafter set forth, together with the accompanying drawings.

DETAILED DESCRIPTION

Figure 1:
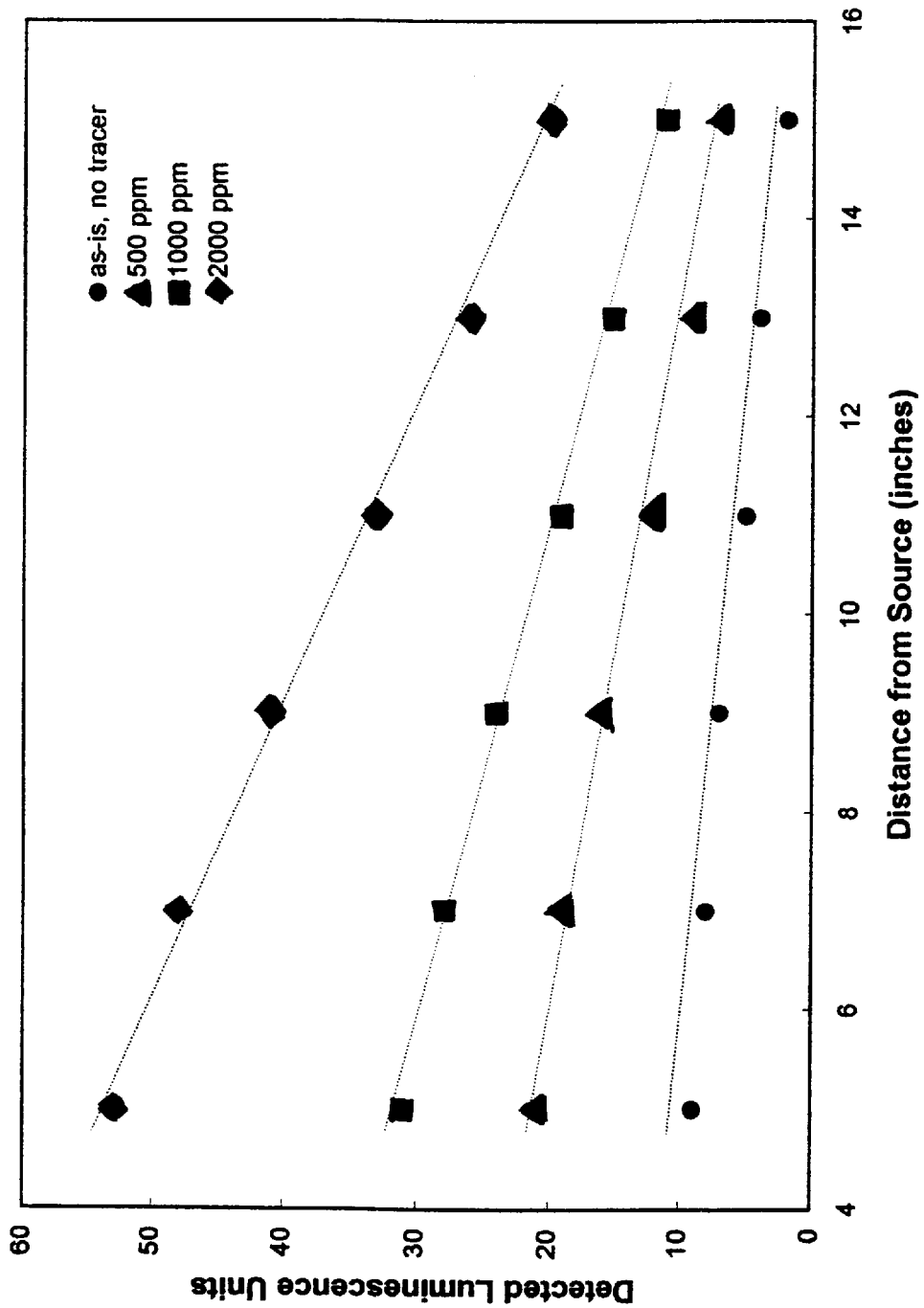
FIG. 1 is a graph representing detected luminescence of a fluorescent mark on an aluminum sheet surface as a function of distance from the detecting scanner and doping level of fluorescent marking agent in lubricant applied to the sheet surface, in the tests described in EXAMPLE 1 below.

The invention will initially be described, for purposes of illustration, as embodied in methods of applying a marking agent to aluminum sheet to provide, on pieces of scrap derived from the sheet, optically detectable surface marks for scrap sorting purposes, and to scrap-sorting methods including such marking procedures. It is to be understood, however, that the invention in its broader aspects is not limited to the sorting of scrap derived from aluminum sheet, but is applicable to other metal stock as well, e.g., to sheet or other stock of steel, copper or magnesium alloys, and to the provision of marks, on scrap pieces, which are detectable in other than optical ways.

In the embodiments now to be described, the invention involves pre-applying a marking agent to the surface of aluminum sheet as part of the routine finishing process in the rolling mill in which the final-gauge sheet is produced, i.e., as part of one of the operations, such as cleaning, pretreatment, or the application of a lubricant or prelubricant, routinely performed on such sheet products before delivery to a manufacturing customer. Examples of marking agents are visible dyes and pigments, fluorescent dyes, compounds having distinctive infrared absorption spectra, and photosensitive materials. Two ways of delivering these compounds to the sheet surface are as part of a pretreatment regime or as an additive to the lubricant or prelubricant applied to the sheet. A pretreatment is anything which permanently changes the surface characteristics of the sheet, such as anodizing, etching or conversion coating. A lubricant is nonpermanent, the surface remaining essentially unchanged once the lubricant is removed. A prelubricant is a thin film of, e.g., mineral oil, over which an automobile manufacturer applies the actual forming lubricant. The lubricant or prelubricant route is currently preferred for the present invention.

In the preferred embodiment, for use where sheets of two aluminum alloy families (e.g., the 5000 series and the 6000 series) contribute to manufacturing scrap, only the sheet from one of the two alloy families is marked; the other remains unmarked. This allows the automotive manufacturer to easily separate the scrap from its stamping operations into the two original alloy families for recycling purposes by using mechanical sorting equipment which is under the control of a detection instrument sensitive to the marking compound.

The invention, in its embodiments now to be described, involves the use of an agent applied to the surface of one or more aluminum sheet alloys to distinguish the alloy from other alloys, and provides a method for applying such agent to the surface of aluminum alloy sheet during production or finishing to result in a treated alloy sheet, that enables subsequent sorting of treated alloys from a mixture of treated and non-treated alloys.

The invention, in these embodiments, concerns the treatment of the surface of one or more aluminum sheet alloys (particularly automotive alloys) as an intrinsic part of the existing manufacturing route to allow the alloys to be distinguished from nontreated alloys in a subsequent sorting operation. Treated alloys may be separated from unmarked alloys using a known color sorting identification and mechanical sorting procedure and equipment, for example that of Huron Valley Steel Corporation of Belleville, Mich.

The treatment can be in the form of coloring agent, a fluorescent dye or a photosensitive material added during or after cleaning (if a cleaning step is present), in the lubricant or prelubricant applied to the sheet or possibly in the pretreatment (the latter for structural alloys only). Whichever method is used, the treatment must be sufficiently robust to allow the alloys to be distinguished after the sheet has been processed through customer stamping operations involving the application of stamping lubricants and material handling.

Methods envisaged for effecting the treatment include roll or brush application, spray or electrostatic deposition, or immersion.

The present invention differs from the procedure of European Patent Application EP 0 861 910 A2 by treating the surface of the sheet product as part of the existing sheet manufacturing and finishing route to produce a treated alloy sheet. The treated sheet product is supplied to the customer and scrap generated during the customer's operations is then capable of being sorted. The surface treatment is designed so as not to degrade the customers' product specifications.

Differentiation between 5000 and 6000 series alloys, for example, for scrap sorting purposes can be made by marking the surface of the scrap in some manner. This marker can then be detected by an optical scanner. In previous work, as represented by the aforementioned European Patent Application, the marker is applied to each piece of scrap by a chemical treatment process and is subsequently detected by color differentiation. In the method of the present invention, the marker is applied to the sheet of the selected series of alloys in the form of an additive to the prelubricant or stamping lubricant. Lubricant or prelubricant is applied in any case to sheet, so the additional cost of applying lubricant or prelubricant with a marker is minimal. Sheet of one series of alloys would have prelubricant or stamping lubricant with marker and another series would have prelubricant or stamping lubricant without marker.

The marker, or additive to the stamping lubricant or prelubricant, can be selected from a number of classes of chemical compounds. The detection process for the marker will then depend upon the type of chemical selected. For example:

1. The marker can be in the form of a soluble organic dye which, when dissolved in the stamping fluid, changes the color of the stamping fluid. Scrap could then be sorted by differentiating between the different colors using a portable color detection device, available from companies such as Byk-Gardner.
2. The marker can also be in the form of a dispersible organic or inorganic dye or pigment. These compounds would also change the color of the stamping lubricant when dispersed therein. The detection process would then be similar to that of (1) above.
3. The marker can be an organic compound which has characteristic infrared absorption frequencies different from the stamping lubricant. Lubricant containing this marker can then be detected using a portable infrared scanner supplied by companies such as Nicolet.
4. The marker can be a fluorescing compound. Lubricant containing this compound exhibits a level of luminescence different from that of lubricant without the fluorescing compound when scanned with a fluorescence scanner such as the LUT 1–4 available from Sick Optics.

5. The marker can be a photosensitive material, defined as a compound that will undergo some permanent and detectable change in response to being irradiated by a particular part of the electromagnetic spectrum. In such case, the mark established by the photosensitive marking agent would be latent unless and until scrap pieces of the marked sheet surface are scanned, for sorting, by a scanner emitting light in the activating portion of the spectrum.

In an exemplary embodiment, in which a producer of aluminum sheet supplies both sheet of 6000 series alloys and sheet of 5000 series alloys for automotive forming operations (customer stamping operations) that generate scrap of both alloy families, to enable sorting and separation of scrap of the two families, the preparation of the sheet of both families includes application of a conventional lubricant, such as that commercially designated "MP404" lubricant, to the sheet surfaces. The MP404 lubricant is applied without additive to the sheet of 6000 series alloys and MP404 lubricant with an added fluorescent tracer is applied to the sheet of 5000 alloys. These lubricant applications can be performed on a continuous coating line. After performance of manufacturing operations by the customer and generation of scrap of both alloy families therein from the supplied sheet, the scrap, commingled, is delivered to a recycling facility. At the recycling facility, separation of alloys is effected using a luminescence scanner to determine whether each scanned piece of scrap came from a sheet bearing lubricant with tracer or without.

In the embodiments thus far described, a lubricant, pre-lubricant or other vehicle containing a marking agent is typically applied to an entire surface of stock prior to the performance of procedures on the stock such as blanking and stamping operations for producing articles therefrom; and, as mentioned, such application may conveniently be performed by the supplier of the stock to a manufacturer. It will be understood that the stock is usually supplied as coiled strip, from which the manufacturer, in a blanking operation, cuts successive discrete pieces or sheets of appropriate shape and size for subjection to a particular stamping operation, i.e., to produce by stamping, from successive sheets, successive articles of identical dimensions and configuration, with scrap portions of the discrete sheets being detached from the article incident to the stamping operation.

For a given discrete cut sheet piece (formed in the blanking operation), which is to be subjected to stamping in a particular orientation to produce an article of given dimensions and configuration, the locations of the surface areas of the sheet piece which will be included in the produced article, and those which will not be so included (i.e., will become surfaces of the scrap) are fully determinable. Thus, as an alternative to precoating entire stock surfaces with a vehicle containing a marking agent, it is practicable for the manufacturer to perform the marking step of the method of the invention by selectively applying marks only in those surface areas of discrete cut pieces of sheets (of the stock of the composition to be identified by marking) that will not be included in a produced article.

Advantageously, an indelible mark is applied in these embodiments of the invention, so that the markings will not be removed (or transferred to surfaces of scrap of other composition) prior to the scanning step in which the mark serves to distinguish the marked scrap of one composition from unmarked (or differently marked) scrap of other composition. The indelible marking agent may be an indelible paint or ink, or a surface modification such as an embossment or other local but detectable deformation. It may be applied prior to or concurrently with performance of a blanking or stamping operation. If the sheet stock bears pre-applied lubricant, it is not necessary to remove the lubricant for application of the indelible marks.

More particularly, the marks may conveniently or preferably be applied in the blanking operation, in which straight-sided sheet pieces, having an outline that very roughly approximates the part or article to be produced by stamping, are formed by cutting the sheet stock. These cut pieces include portions that will become scrap when the stamping operation is performed, as well as a portion that will become the article produced in the stamping operation. After blanking, the cut sheet pieces are stacked and delivered to the stamping operation where the article is produced.

In the blanking plant, a computer has a stored outline of the part or article which will subsequently be produced by stamping. For performing the method of the present invention, a movable marking head may be attached to the blanking machine, and the computer may be programmed with instructions to guide the head to apply the marks to the desired locations on the sheet surface, i.e., at portions which will become scrap in the stamping operation. As an alternative, a computer-controlled movable head for marking such portions can be provided at the stamping operation itself.

Some scrap may be generated in the blanking operation, but blanking plants typically handle such scrap in ways that do not involve commingling of scrap of different compositions, and therefore scrap generated by blanking ordinarily does not require marking in accordance with the invention. The greatest use of the invention is for marking scrap generated in stamping operations.

The applied marking need not cover all or even most of the surface area of the scrap bearing the mark; it is sufficient that the mark be visibly or otherwise detectably present, for detection by scanning, somewhere on a surface of each piece of scrap. To this end, marks may be applied to both surfaces of those sheet portions that will become scrap, thereby insuring that each scrap piece will bear at least one detectable mark even if the scrap becomes bent or deformed.

Although the indelibly marked scrap may be passed through a decoater if desired after sorting, it is generally not necessary to remove the indelible marks applied in accordance with this embodiment of the invention because the individual marks are small in relation to the surface area of the scrap. It is sufficient, for the attainment of the results and advantages of the invention, to apply enough such small marks to ensure that each piece of scrap (of sheet of the composition being marked) will have at least one detectable surface mark.

The selective marking of only surface areas of stock that will not be included in an article manufactured from the stock enables the use of marks of an indelible character that would be undesirable if present on the produced article. Thereby, the desired assured durability and nontransferability of the marking, required to distinguish scrap of different compositions by scanning, can be achieved with no derogation from article quality.

As in other embodiments of the invention, detectable marks may be applied only to non-article surface areas of stock of one composition, or detectably different marks may respectively be applied to non-article surface areas of stock of different compositions which are to be distinguished from each other.

By way of further illustration of the invention, reference may be made to the following specific examples, in conjunction with the drawings.

EXAMPLE 1

FIG. 1 summarizes initial experiments on the use of luminescence as a means of separating automotive sheet for recycling. "MP404" lubricant, with and without fluorescent tracer added (and with various levels of fluorescent tracer addition or doping in the tracer-added specimens) was applied to aluminum sheet surfaces, and the lubricant-bearing surfaces were scanned to measure luminescence at various surface-to-scanner distances.

The lubricant was applied to the sheet (in this and the following Examples) with a draw-down bar set to deliver a nominal level of 125 mg/ft$^2$. Where the lubricant was doped with the fluorescent dye (tracer), the lubricant was first heated to 70° C., the required amount of dye was added, and the mixture was then stirred until it was homogeneous.

The luminescence scanner employed was a LUT 1–4, made by Sick Optics. Its basic principle of operation is simple: the scanner emits ultraviolet light, then measures the luminescence in the visible range given off by the object being scanned. The fluorescent tracer or probe (i.e., marking agent) employed in these tests was Fluor Yellow 131sc, made by Morton Thiokol, which was selected particularly for its non-carcinogenic quality (many fluorescent species are carcinogens). A baseline was obtained by measuring the luminescence from sheet coated with standard (undoped) MP404 lubricant at a nominal coating weight of 125 mg/ft$^2$ at various distances from the sheet surface. As expected, there is a small amount of fluorescence from the undoped MP404 lubricant. The MP404 was then doped with the FY 131sc tracer at levels up to 2,000 ppm. The level of luminescence increased greatly, as shown in FIG. 1.

The effects of distance from the sheet surface and concentration of tracer provide a preliminary estimation of the ability of the system to measure small amounts of fluorescence quantitatively. obviously there will be much less than 125 mg/ft$^2$ on the scrap by the time it reaches the recycling facility, especially if a blank washer is used before the sheet goes into the stamping press. It is desirable not to use any more tracer than needed, to keep the cost down.

The results graphically shown in FIG. 1 are set forth in TABLE 1 below:

TABLE 1

| Distance from Source (inches) | MP404 as-is | 500 ppm FY | 1000 ppm FY | 2000 ppm FY |
|---|---|---|---|---|
| 5 | 9 | 21 | 31 | 53 |
| 7 | 8 | 19 | 28 | 48 |
| 9 | 7 | 16 | 24 | 41 |
| 11 | 5 | 12 | 19 | 33 |
| 13 | 4 | 9 | 15 | 26 |
| 15 | 2 | 7 | 11 | 20 |

In summary, these tests demonstrated that the difference in luminescence between MP404 lubricant doped with 500 to 2,000 ppm fluorescent tracer and the same lubricant without tracer could readily be detected at distances up to about 15 inches between the sample and the scanner. The work also showed that the MP404 lubricant alone also fluoresced to a certain extent.

EXAMPLE 2

Figure 2:
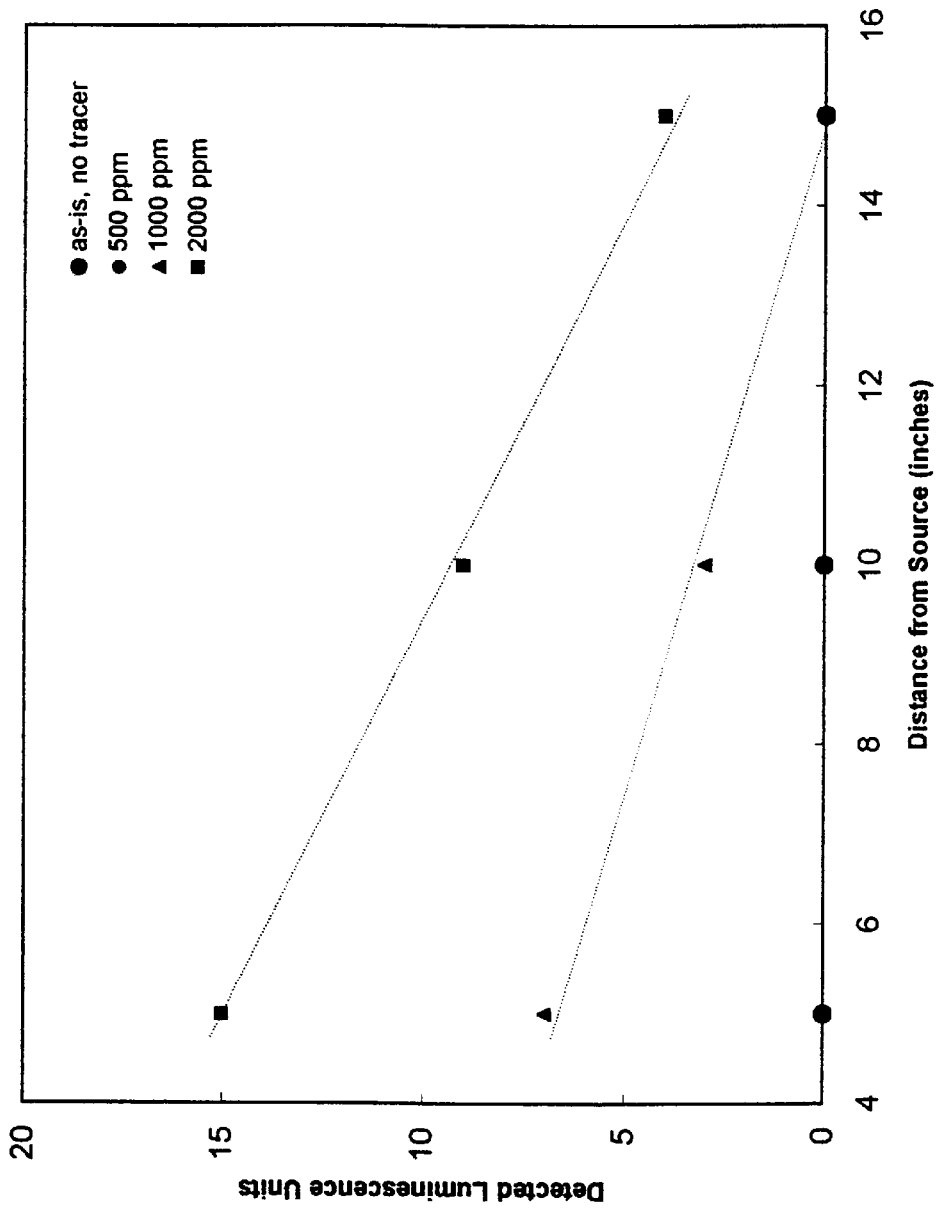
FIG. 2 is a graph representing detected luminescence of a fluorescent mark on an aluminum sheet surface as a function of distance from the detecting scanner and doping level of fluorescent marking agent in lubricant applied to the sheet surface, after partial removal of the lubricant, in the tests described in EXAMPLE 2 below.

A further group of tests were performed to clarify the detection limit of fluorescent tracer since in practice much of the lubricant may be lost by the time scrap pieces reach the recycling facility. To approximate this effect, samples with an initial lubricant level of 125 mg/ft$^2$, doped with indicated levels of the same fluorescent tracer as in Example 1 or undoped, were wiped down with tissue to remove most of the lubricant. It was very difficult to obtain an accurate measure of the amount of residual lubricant; the experimenters' estimate is about 10 to 20 mg/ft$^2$. The luminescence data for these samples with low (reduced) lubricant level are summarized in FIG. 2 and in TABLE 2 below. At these lubricant levels, no luminescence was detected from the MP404 lubricant without tracer or doped with 500 ppm tracer (note that in FIG. 2, the dots representing 500 ppm doping with tracer and the dots representing "as-is" lubricant with no tracer are indistinguishable from each other because they are superimposed on the horizontal axis at zero detected luminescence). However, the sample with 2,000 ppm tracer still emitted sufficient luminescence to be detectable at a distance of 15 inches from the sample. This indicates that to provide an optically detectable mark on the scrap surface it is desirable to dope the lubricant with approximately 2,000 ppm of the fluorescent tracer used in this example. Clearly the higher the tracer level, the lower the amount of lubricant that can be detected. However, the cost of the tracer addition then increases. A practical operating range can be worked out upon determining what residual lubricant level is to be expected in particular manufacturing operations.

TABLE 2

| Distance from Source (inches) | MP404 as-is | 500 ppm FY | 1000 ppm FY | 2000 ppm FY |
|---|---|---|---|---|
| 5 | 0 | 0 | 7 | 15 |
| 10 | 0 | 0 | 3 | 9 |
| 15 | 0 | 0 | 0 | 4 |

EXAMPLE 3

Figure 3:
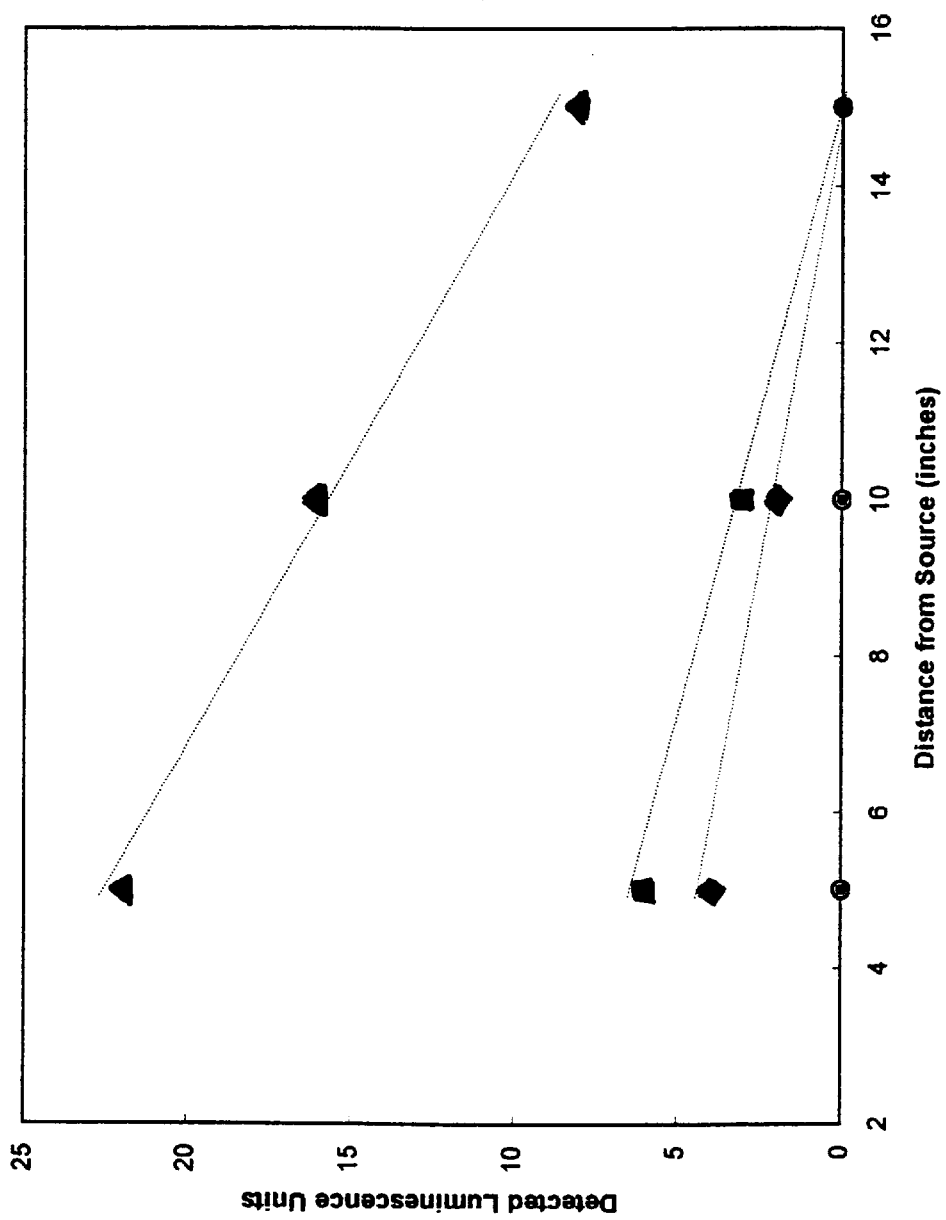
FIG. 3 is a graph representing detected luminescence of a fluorescent mark on an aluminum sheet surface as a function of distance from the detecting scanner for sheet surfaces bearing undoped ("as-is") lubricant and lubricant doped with a fluorescent tracer, using various colored filters, in the tests described in EXAMPLE 3 below.

The inherent fluorescence of the MP404 lubricant presents some difficulty in that a sample with high lubricant level but no tracer could emit the same luminescence as a sample with low lubricant level containing the fluorescent tracer. Therefore a method of eliminating background luminescence is desirable. To do this, using the same scanner equipment, lubricant and fluorescent tracer dopant as in the above Examples, luminescence was measured with a set of filters placed in the luminescence scanner. In this experiment, all samples were coated with the lubricant at a coating weight of 125 mg/ft$^2$, with and without the tracer, the latter being designated "as is." When the tracer was present, the doping level was 2,000 ppm. The results (summarized in FIG. 3 and in TABLE 3 below) show that the luminescence is undetectable at a distance of 15 inches from the samples with no tracer added or with tracer added but using a red or dark red filter (note that in FIG. 3, the dots representing "as-is" lubricant, i.e., with no tracer, for all three filters are indistinguishable from each other because they are superimposed on the horizontal axis representing zero detected luminescence) With the orange filter, the luminescence from the sample with no tracer was completely blocked, i.e., background luminescence from the MP404 lubricant was eliminated. However, the luminescence from the sample with tracer could readily be detected.

TABLE 3

| Distance from Source (inches) | Dark Red (610–665 nm) As-is | Dark Red (610–665 nm) 2000 ppm | Red (610–665 nm) As-is | Red (610–665 nm) 2000 ppm | Orange (570 nm) As-is | Orange (570 nm) 2000 ppm |
|---|---|---|---|---|---|---|
| 5 | 0 | 4 | 0 | 6 | 0 | 22 |
| 10 | 0 | 2 | 0 | 3 | 0 | 16 |
| 15 | 0 | 0 | 0 | 0 | 0 | 8 |

It is to be understood that the invention is not limited to the procedures and embodiments hereinabove specifically set forth, but may be carried out in other ways without departure from its spirit.

What is claimed is:

1. In a method of sorting metal scrap comprising a mixture of scrap metal pieces respectively derived from metal stock of at least two different compositions, to separate the scrap metal pieces of a first of said compositions from the scrap metal pieces of a second of said compositions, said stock of each of said two compositions having a surface and being initially separate from the stock of the other of said two compositions, said scrap being generated and mixed during or after procedures performed on said stock of said two compositions, and said scrap metal pieces of each of said two compositions bearing portions of the surface of the stock from which they are derived, the steps of (a) prior to or during the performance of said procedures, while said metal stock of said first composition is separate from the metal stock of said second composition, selectively marking the surface of only the stock of said first composition to provide a detectable surface mark on said surface portions on said scrap metal pieces of said first composition after the performance of said procedures, such that said mark is present only on said scrap metal pieces of said first composition in said mixture, and (b) scanning the mixture of metal scrap to detect said mark on scrap metal pieces therein, and thereby to distinguish said scrap metal pieces of said first composition from other scrap metal pieces in said mixture.

2. A method according to claim 1, wherein said marking step is performed by selectively applying a marking agent to the surface of only the stock of said first composition in an amount effective to provide said detectable surface mark on said surface portions on said scrap metal pieces of said first composition after the performance of said procedures.

3. A method according to claim 1, wherein said marking step is performed prior to the performance of said procedures.

4. A method according to claim 3, wherein said marking step is performed by selectively applying a marking agent to the surface of only the stock of said first composition in an amount effective to provide said detectable surface mark on said surface portions on said scrap metal pieces of said first composition after the performance of said procedures.

5. A method according to claim 4, further including a step of segregating the scrap metal pieces on surface portions of which said mark is detected upon detection of said mark thereon in said scanning step.

6. A method according to claim 4, further including the step, performed prior to the performance of said procedures and while said metal stock of said first composition is separate from the metal stock of said second composition, of selectively applying a second marking agent to the surface of only the stock of said second composition in an amount effective to provide a detectable surface mark on said surface portions on said scrap metal pieces of said second composition after the performance of said procedures, such that said mark is present only on said scrap metal pieces of said second composition in said mixture, the detectable surface mark thus provided on said second-composition scrap metal pieces being detectably different from the aforesaid mark provided on the first-composition scrap metal pieces; and wherein the scanning step comprises scanning the mixture of metal scrap to detect the surface mark provided by the first-mentioned marking agent on the first-composition scrap metal pieces and the surface mark provided by said second marking agent on the second-composition scrap metal pieces therein, thereby to distinguish said scrap metal pieces of said first and second compositions from each other and from any other scrap metal pieces in said mixture.

7. A method according to claim 4, wherein said metal stock is prepared for said procedures by being subjected to at least one preparatory step, and wherein said marking agent is applied to the surface of the first-composition stock in said one preparatory step.

8. A method according to claim 7, wherein said one preparatory step is a surface treatment comprising applying a substance to the surface of said first-composition stock, said method further including the step of incorporating said marking agent in said substance prior to application of said substance to the first-composition stock surface.

9. A method according to claim 8, wherein the step of applying a substance is selected from the group consisting of coating, washing, etching, prelubricating and lubricating steps.

10. A method according to claim 4, wherein said metal stock of each composition is aluminum sheet.

11. A method according to claim 10, wherein said first-composition aluminum sheet consists of sheet of one or more aluminum alloy compositions within a first family of alloys consisting of specifically different compositions having at least one shared compositional characteristic, and said second-composition aluminum sheet consists of sheet of one or more aluminum alloy compositions within a second family of alloys consisting of specifically different compositions having at least one shared compositional characteristic that differentiates the members of the second family from the first family.

12. A method according to claim 11, wherein one of said first and second families is the Aluminum Association 5000 series of alloys.

13. A method according to claim 12, wherein the other of said first and second families is the Aluminum Association 6000 series of alloys.

14. A method according to claim 10, wherein said procedures are operations for manufacturing articles from said aluminum sheet of each of said compositions, said scrap is manufacturing scrap generated incident to said manufacturing operations, said aluminum sheet of said first and second compositions is prepared for said manufacturing operations by being subjected to steps including at least one surface treatment, and wherein said marking agent is applied to the surface of the first-composition sheet in said one surface treatment.

15. A method according to claim 14, wherein the surface treatment step comprises applying a lubricant or prelubricant to said surface of said aluminum sheet of said first composition in preparing the sheet for the manufacturing operation, said method further including incorporating said marking agent into said lubricant or prelubricant before applying said lubricant to said sheet surface.

16. A method of applying a marking agent to metal stock for scrap sorting purposes, comprising
(a) preparing metal stock of a first composition for subjection to a manufacturing operation, said stock having a surface, by subjecting said stock to at least one preparatory step, while
(b) applying to said stock surface, in said one preparatory step, a marking agent in an amount effective to provide a detectable surface mark on scrap metal pieces derived from said stock during or after the manufacturing operation and bearing portions of the stock surface, thereby to enable scrap pieces of said stock to be distinguished from scrap pieces of stock of other composition different from said first composition in a mixture of scrap metal pieces of said first and other compositions.

17. A method of applying a marking agent to metal stock for scrap sorting purposes, comprising
(a) preparing metal stock of a first composition for subjection to a manufacturing operation, said first-composition stock having a surface, by subjecting said stock to at least one preparatory step, and
(b) preparing metal stock of a second composition for subjection to a manufacturing operation, said second-composition stock having a surface, by subjecting said second-composition stock to at least one preparatory step, while
(c) applying to said first-composition stock surface, in said one preparatory step to which the first-composition stock is subjected, a first marking agent in an amount effective to provide a detectable surface mark on scrap metal pieces derived from said first-composition stock during or after the manufacturing operation and bearing portions of the first-composition stock surface, and
(d) applying to said second-composition stock surface, in said one preparatory step to which the second-composition stock is subjected, a second marking agent in an amount effective to provide a detectable surface mark on scrap metal pieces derived from said second-composition stock during or after the manufacturing operation and bearing portions of the second-composition stock surface, said last-mentioned surface mark being detectably distinguishable from the aforesaid surface park provided on first-composition scrap metal pieces,
thereby to enable scrap pieces of said first-composition stock and scrap pieces of said second-composition stock to be distinguished from each other and from scrap pieces of stock of any other composition in a mixture of scrap metal pieces of said first and second compositions optionally also including scrap metal pieces of other compositions.

18. A method of applying a marking agent to aluminum sheet for scrap sorting purposes, comprising
(a) preparing aluminum alloy sheet of a first alloy composition for subjection to a manufacturing operation, said sheet having a surface, while
(b) applying to said sheet surface, incident to preparing said sheet as aforesaid, a marking agent in an amount effective to provide a detectable surface mark on scrap metal pieces derived from said sheet during or after the manufacturing operation and bearing portions of the sheet surface, thereby to enable scrap pieces of said sheet to be distinguished from scrap pieces of sheet of an aluminum alloy of other composition different from said first composition in a mixture of scrap metal pieces of said first and other compositions.

19. A method according to claim 18, wherein said preparing step is a surface treatment comprising applying a substance to the surface of said first-composition sheet, said method further including the step of incorporating said marking agent in said substance prior to application of said substance to the first-composition sheet surface.

20. A method according to claim 19, wherein the step of applying a substance is selected from the group consisting of coating, washing, etching, prelubricating and lubricating steps.

21. A method according to claim 20, wherein the step of applying a substance is a lubricating or prelubricating step and the incorporating step comprises incorporating said marking agent in a lubricant or prelubricant for application in said lubricant or prelubricant to said sheet in the lubricating step.

22. A method of preparing aluminum sheet for scrap sorting purposes, comprising
(a) preparing aluminum sheet of a first alloy composition for subjection to a manufacturing operation, said first-composition sheet having a surface, and
(b) preparing aluminum sheet of a second alloy composition different from said first composition for subjection to a manufacturing operation, said second-composition sheet having a surface, while
(c) selectively applying only to the surface of said first-composition sheet, and not to the surface of the second-composition sheet, incident to preparing said sheets as aforesaid, a marking agent in an amount effective to provide a detectable mark on scrap metal pieces derived from said first-composition sheet during or after the manufacturing operation and bearing portions of the first-composition sheet surface, thereby to enable scrap pieces of said first-composition sheet to be distinguished by scanning from scrap pieces of said second-composition sheet in a mixture of scrap metal pieces of said first and second compositions.

23. A method according to claim 22, further including the step of selectively applying only to the surface of said second-composition sheet, and not to the surface of the first-composition sheet, incident to preparing said sheets as aforesaid, a second marking agent in an amount effective to provide a detectable mark on scrap metal pieces derived from said second-composition sheet during or after the manufacturing operation and bearing portions of the second-composition sheet surface, the mark thereby provided on the second-composition scrap pieces being distinguishable from the aforesaid mark provided on scrap pieces of said first-composition sheet.

24. A method according to claim 23, wherein the applying step comprises incorporating said marking agent in a lubricant or prelubricant and applying said lubricant or prelubricant containing said marking agent to said first-composition sheet, and wherein any lubricant or prelubricant applied in the step of preparing the second-composition sheet is essentially free of said marking agent.

25. A method according to claim 24, wherein said first-composition sheet consists of sheets of one or more alloy compositions within a first family of alloys consisting of specifically different compositions having at least one shared compositional characteristic, and said second-composition sheet consists of sheets of one or more alloy compositions within a second family of alloys consisting of specifically different compositions having at least one shared compositional characteristic that differentiates the members of the second family from the first family.

26. A method according to claim 25, wherein one of said first and second families is the Aluminum Association 5000 series of alloys.

27. A method according to claim 26, wherein the other of said first and second families is the Aluminum Association 6000 series of alloys.

28. A method of sorting metal scrap generated incident to manufacturing operations performed on aluminum sheet of at least two different alloy compositions, the sheet of each said composition having a surface and the scrap comprising a mixture of scrap metal pieces respectively derived from the aluminum sheet of each of said compositions and bearing portions of the surface of the sheet from which the pieces are derived, said method comprising:

(a) subjecting, to the manufacturing operations, sheet of a first of said compositions bearing on its surface a marking agent applied thereto, prior to the manufacturing operations, in an amount effective to provide a detectable mark on said scrap metal pieces derived from said first-composition sheet, and sheet of a second of said compositions which is essentially free of said marking agent; and (b) scanning the mixture of metal scrap to detect said mark on scrap metal pieces therein, and thereby to distinguish said scrap metal pieces of said first composition from other scrap metal pieces in said mixture.

29. In a method of sorting metal scrap comprising a mixture of scrap metal pieces respectively derived from metal stock of at least two different compositions, to separate the scrap metal pieces of a first of said compositions from the scrap metal pieces of a second of said compositions, said stock of each of said two compositions having a surface and being initially separate from the stock of the other of said two compositions, said scrap being generated and mixed during or after procedures performed on said stock of said two compositions to produce articles bearing first portions of the surface of the stock from which they are made and to detach said scrap from said articles, and said scrap metal pieces of each of said two compositions bearing second portions of the surface of the stock from which they are derived, the steps of (a) prior to or during the performance of said procedures, while said metal stock of said first composition is separate from the metal stock of said second composition, selectively marking only said second portions of the surface of the stock of the first composition to provide a detectable surface mark thereon after the performance of said procedures, such that said mark is present only on said scrap metal pieces of said first composition in said mixture, and (b) scanning the mixture of metal scrap to detect said mark on scrap metal pieces therein, and thereby to distinguish said scrap metal pieces of said first composition from other scrap metal pieces in said mixture.

30. A method according to claim 29, wherein said mark is an indelible mark.

31. A method according to claim 30, wherein the marking step comprises applying an indelible marking agent to said second surface portions.

32. A method according to claim 30, wherein the marking step comprises locally deforming at least one area of each said second surface portion.

33. A method according to claim 30, wherein the marking step is performed prior to the performance of said procedures.

34. A method according to claim 30, wherein the marking step is performed substantially concurrently with the performance of said procedures.

35. A method according to claim 30, wherein said stock of said first composition is provided as a strip, wherein said procedures include a blanking operation for cutting the strip into discrete sheet pieces and a stamping operation performed on said sheet pieces to form said articles and to detach said scrap therefrom, and wherein said marking step is performed on said sheet pieces incident to said blanking operation.

36. A method according to claim 30, further including the steps of:

prior to or during the performance of said procedures, while said metal stock of said first composition is separate from the metal stock of said second composition, selectively marking only the second portions of the surface of the stock of the second composition to provide a second detectable surface mark on said second surface portions on said scrap metal pieces of said second composition after the performance of said procedures, such that said second detectable surface mark is present only on said scrap metal pieces of said second composition in said mixture, said second detectable surface mark being distinguishable from the first-mentioned detectable surface mark on the scrap metal pieces of the first composition.

* * * * *